May 26, 1925.　　　　　　　　　　　　　　　　　1,539,254
F. H. GEHRKE
AUTOMATIC CONTROL FOR WINDMILL PUMPS
Filed Sept. 25, 1924　　　2 Sheets-Sheet 1
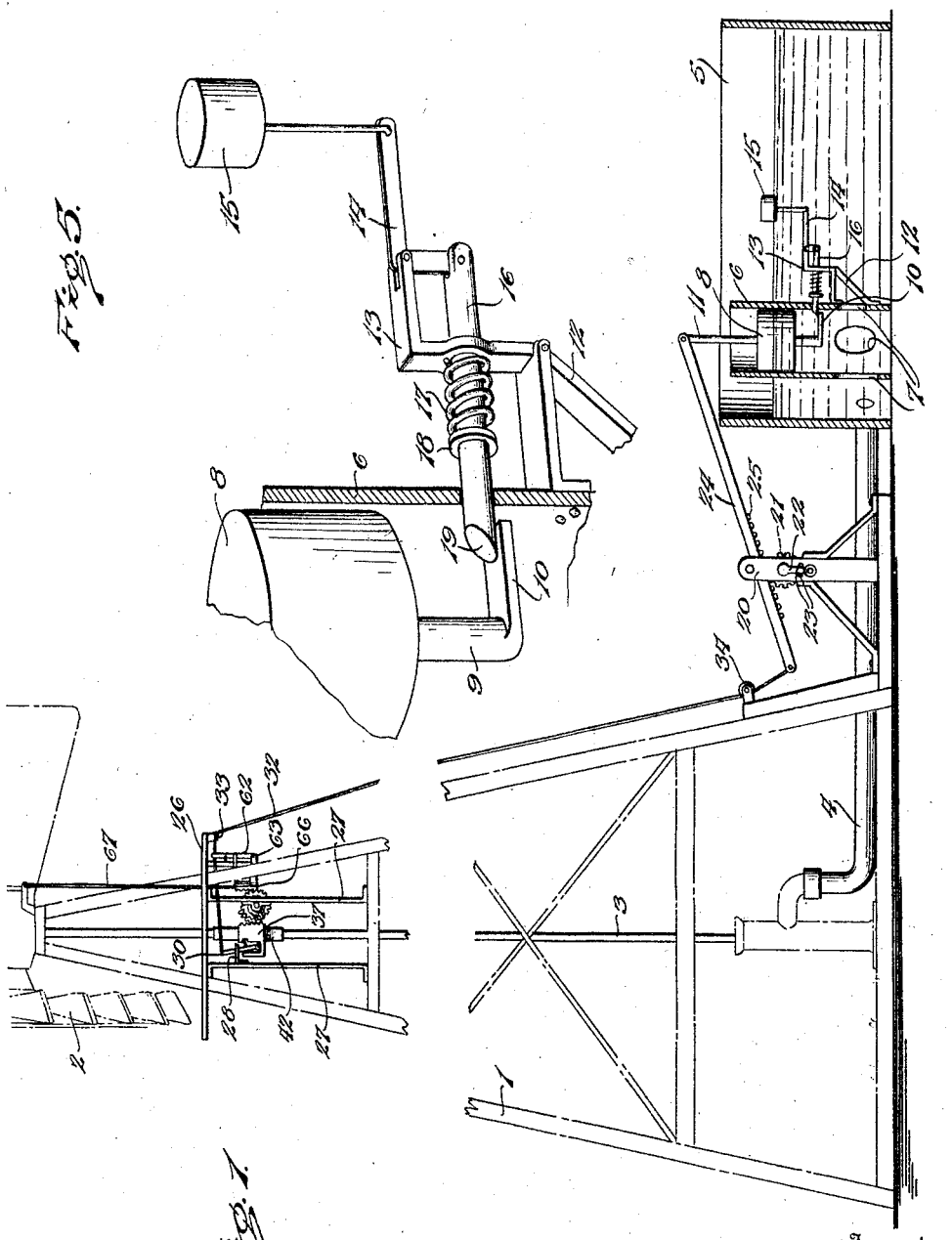

May 26, 1925.
F. H. GEHRKE
AUTOMATIC CONTROL FOR WINDMILL PUMPS
Filed Sept. 25, 1924
1,539,254
2 Sheets-Sheet 2
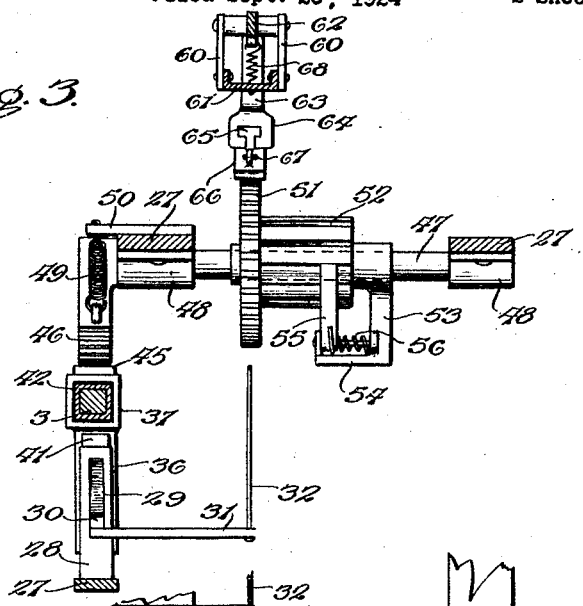
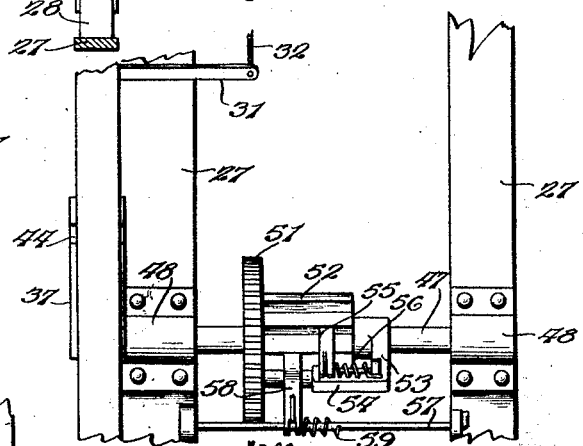
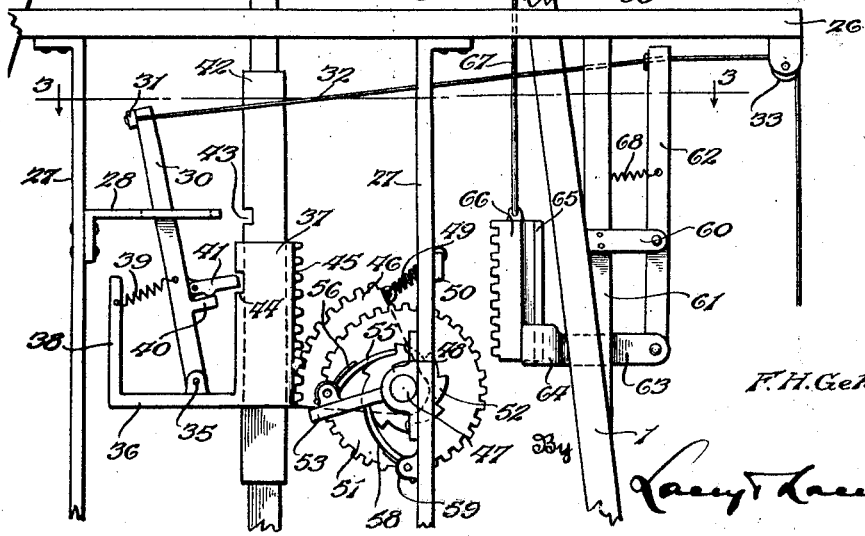
Inventor
F. H. Gehrke
By Lacey & Lacey, Attorney Patented May 26, 1925.

1,539,254

UNITED STATES PATENT OFFICE.

FRED H. GEHRKE, OF HAZEL RUN, MINNESOTA.

AUTOMATIC CONTROL FOR WINDMILL PUMPS.

Application filed September 25, 1924. Serial No. 739,880.

*To all whom it may concern:*

Be it known that I, FRED H. GEHRKE, a citizen of the United States, residing at Hazel Run, in the county of Yellow Medicine and State of Minnesota, have invented certain new and useful Improvements in Automatic Controls for Windmill Pumps, of which the following is a specification.

This invention relates to means for controlling the operation of a pump driven by a wind wheel and has for its object the provision of means whereby as the tank or reservoir is filled the wind wheel will be thrown out of operation and as the water is drawn from the tank and the supply reaches the exhaustion point the wind wheel will be automatically thrown into gear so that the pump will again operate. The invention provides mechanism for the stated purpose which will be inoperative to check the operation of the pump until the tank is nearly full and will then be thrown into action so that the continued operation of the pump will serve to eventually stop the driving action of the wind wheel. These objects and other objects which will incidentally appear in the course of the following description are attained in such an apparatus as is illustrated in the accompanying drawings, and the invention resides in certain novel features of the same which will be hereinafter first fully described and then more particularly pointed out in the appended claims.

In the drawings:

Figure 1 is a view, partly in elevation and partly in section, showing my apparatus mounted upon a windmill tower in operative position;

Fig. 2 is an enlarged elevation of a portion of the mechanism immediately under the platform of the windmill tower;

Fig. 3 is a horizontal section on the line 3—3 of Fig. 2;

Fig. 4 is an elevation of a portion of the mechanism shown in Fig. 2 and viewed from the left of Fig. 2, and Fig. 5 is an enlarged detail perspective view of the floats which control the action of the invention.

The windmill tower, indicated at 1, and the wind wheel, indicated at 2, may be of any approved form and are illustrated in a conventional manner only. The wind wheel is connected through the usual gearing with a pump rod 3 which operates under the power of the wind wheel to draw water water from a well and deliver it through a pipe 4 into a tank or reservoir 5. Within the tank, I provide a float chamber 6 having openings 7 through its wall whereby to establish free communication between the interior of the float chamber and the tank and permit the water to rise within the float chamber to the same level that it assumes in the tank. Disposed within the float chamber 6 is a large float 8 of a diameter to fit closely but move easily within the said chamber and from the under side of said float depends a stem 9 having a laterally extending arm or stud 10 at its lower end. From the upper side of the float, a rod 11 rises for a purpose which will presently appear. A bracket 12 is secured on the side of the float chamber 6, and this bracket carries a post or support 13 upon which is fulcrumed an angle lever 14, to the free end of which is connected a small float 15. The inner arm of the angle lever depends from its fulcrum and a latch pin 16 is pivoted to said arm and extends therefrom through a guide opening in the post 13 and a similar opening in the side of the float chamber 6 so that the inner end of the latch pin may project over and engage the lateral arm or stud 10 and thereby hold the float 8 against upward movement. A spring 17 is disposed between the post 13 and an abutment 18 on the latch pin 16 and tends constantly to move the latch pin into the float chamber 6 so that it will be maintained normally in the position shown in Fig. 5. The inner free end of the latch pin is beveled, as indicated at 19, so that the arm or stud 10 may easily ride thereover and engage the under side of the pin.

Between the tank and the windmill tower, a standard or frame 20 is provided and in this standard or frame is journaled a spur gear 21 having its shaft equipped with a crank handle 22 whereby it may be rotated. The crank handle is normally held in a pendent position, as shown in Fig. 1, by stop pins 23 provided upon the post 20 in position to receive the crank handle between them. Disposed adjacent the upper end of the post 20 is a beam 24 which is provided on its under side with a rack 25 meshing with the gear 21 and has one end projecting over the tank 5 and pivoted to the upper end of the stem 11 which rises from the larger float 8. This beam 24 is obviously rocked by the action of the float 8 in the operation of the apparatus and its fulcrum or rocking point may be shifted longitudinally by properly rotating the spur gear 21 in an obvious manner. As the beam is thus shifted longitudinally, the relative lengths of its arms will, of course, be varied and, consequently, the beam may be accurately timed to set the cut-off mechanism according to the requirements of any given circumstances.

Secured at their upper ends to the windmill platform 26 and at their lower ends to a cross bar or brace of the wind-mill tower are a plurality of standards 27 which constitute supports for those elements of the mechanism which act more directly upon the wind wheel to throw the same out of gear.

Secured rigidly upon one of these supports 27 and projecting therefrom toward the pump rod is a guide bracket 28 having a slot 29 through which extends a lever or rocking arm 30. To the upper end of this lever or rocking arm 30 is secured a bar 31 which extends laterally from the lever and has a cable 32 attached to its free end. This cable 32 extends laterally below the platform 26 to a guide roller 33 mounted on the said platform and thence extends downwardly to a second guide roller 34 adjacent the base of the windmill tower, and is attached below the said roller 34 to the beam 24, as shown clearly in Fig. 1. The lever or rocking arm 30 is pivoted at its lower end, as shown at 35, upon a plate or arm 36 extending from a sleeve 37. From the outer end of the arm or plate 36 rises a post 38, and a spring 39 is attached to said post and to the lever 30 and tends constantly to hold the lever in the position shown in Fig. 2. Above its lower end, the lever or rocking arm 30 is provided with a stop lug 40 projecting toward the pump rod, and immediately above the stop lug a dog 41 is pivoted to the lever and projects therefrom toward the pump rod, the downward movement of the dog being limited by the stop lug 40, as is shown in Fig. 2. The pump rod ordinarily will reciprocate through the sleeve 37, and, to guide the rod in such movement and permit it to move freely, a guide sleeve 42 is secured around the pump rod and passes through the sleeve. Notches 43 and 44 are formed in the guide sleeve and in the sleeve 37, respectively, and are adapted to be engaged by the dog 41 when the windmill is to be thrown out of gear so that the continued operation of the pump rod will then cause the sleeve 37 to reciprocate therewith. On the side of the sleeve 37 remote from the lever or rocking arm 30, a rack 45 is formed thereon and this rack meshes with a segmental gear 46 which is fixed on the adjacent end of a shaft 47 which is journaled in bearings 48 upon the adjacent standards 27, as clearly shown in Figs. 2, 3 and 4. A spring 49 attached to the gear 46 and to a bracket 50 projecting from the adjacent standard 27 serves to support the gear 46 and prevent it dropping to an inoperative position in the event that it should become disengaged from the rack 45.

Fitted loosely upon the shaft 47 between its ends is a spur gear 51 and formed upon one side of this spur gear is a ratchet wheel or hub 52 which, of course, is also loose upon the shaft 47. Fixed to the said shaft immediately adjacent the ratchet wheel 52 is a rocking arm 53 which has its outer end extended laterally so as to assume a position parallel with the ratchet wheel 52, as shown at 54, and pivotally mounted upon the extremity of this lateral extension 54 is a pawl or dog 55 which is in engagement with the ratchet wheel 52 and is held in such engagement by a spring 56 suitably mounted upon the arm and connected with the pawl. Secured to and extending between the standards 27 which support the shaft 47 is a brace rod 57 and a pawl or dog 58 is pivotally mounted upon this brace rod below the shaft 47 and engages the ratchet wheel 52 to prevent retrograde movement of the same. A spring 59 is connected to the brace rod 57 and the dog 58 so as to hold the dog in engagement with the ratchet wheel.

Pivoted between its ends upon a bracket 60 which projects from a fixed part 61 of the supporting structure or tower is a rocking arm or lever 62 which has its upper end connected with the cable 32 near the guide roller 33, as shown most clearly in Fig. 2. A guide arm 63 is pivoted to the lower end of the rocking arm or lever 62 and extends laterally therefrom in the general direction of the pump rod, being formed at its free end with a head 64 having a vertical T-shaped groove provided therein to engage the corresponding T-shaped rib 65 formed on the back of a rack bar 66 which is adapted to mesh with the gear 51, as will be readily understood upon reference to Figs. 2 and 3. The rod or cable 67 which serves to throw the wind wheel into or out of gear is attached to the upper end of the rack bar 66 and rises therefrom to the windmill head where it is connected in the usual manner with the wind wheel or other working parts so that a downward pull upon the said rod or cable will throw the windmill out of gear while an upward movement of the same will permit the wind wheel to go back into gear. A spring 68 is attached to the lever or rocking arm 62 and the fixed support 61 and tends constantly to swing the lever so that the arm 63 and the rack bar 66 will be moved outwardly with respect to the gear 51.

When the tank is empty or nearly empty, the floats 15 and 8, will, of course, be in low positions and the descent of the larger float 8 will have rocked the beam 24 so that the end thereof adjacent the tower will have been somewhat raised, thereby putting slack in the cable or flexible connection 32 and permitting the springs 39 and 68 to draw the respective levers 30 and 62 into the positions shown in Fig. 2. The pump rod is free to operate and the rack bar 66 will be in its raised position permitting the wind wheel to move into gear in the usual manner. As the tank fills, the floats will, of course, rise and the upward movement of the floats will cause the beam 24 to rock in the opposite direction and thereby pull upon the cable 32 so that the arms or levers 30 and 62 will be moved against the force of the respective springs 39 and 68 and the sleeve 37 will be locked to the pump rod, while the rack bar 66 will be thrown into mesh with the gear 51. This action, however, does not occur immediately, inasmuch as the spring 17 will throw the latch pin 19 inwardly into the path of the stud or arm 10 and, consequently, arrest the upward movement of the larger float, this spring having strength enough to support the smaller float 15 elevated relative to the level of the water so that this float will not always descend to the limit reached by the water level. Eventually, however, the rising water will exert such a pressure upon the float 15 that it will be raised against the tension of the spring 17 and the latch pin 16 will be withdrawn from the stud 10, whereupon the larger float 8 will rise to the level of the water. When the larger float rises, the pull exerted upon the cable 32 will, as has been stated, overcome the force of the springs 39 and 68 and the rocking arms 30 and 62 will be swung in the general direction of the pump rod. The dog 41 will be thereby carried into the recess or notch 44 in the sleeve 37 and, as said notch is provided with an opening at its center, the dog will spring into engagement with the notch 43 in the guide sleeve 42 when the reciprocation of the pump rod causes the latter notch to register with the notch or recess 44. The sleeve 37 with its rack 45 will thus be locked to the pump so that it will reciprocate therewith and the segmental gear 46 will be then obviously caused to oscillate. The movement of the gear 46 will be transmitted directly to the shaft 47 and the arm 53 which is secured to the said shaft will be consequently caused to oscillate in the same manner as the gear 46. Upon the upstroke of the pump rod, consequently, the pawl or dog 55 will partly turn the ratchet wheel 52 and the ratchet wheel will be held in the position to which it is moved by the dog 58, so that upon the reverse movement of the gear 46 and the shaft 47, resulting from the downward movement of the pump rod, the dog 55 will ride over the ratchet wheel to engage a succeeding tooth of the same. Inasmuch as the ratchet wheel is fixed to the gear 51, it will impart a step by step movement to the said gear which will transmit the movement to the rack bar 66 and thereby exert a downward pull upon the rod or cable 67. Eventually, this pull will draw the rod or cable 67 downwardly to such an extent that the wind wheel will be thrown out of gear. The parts will remain in this position until the water has been drawn from the tank 5 to such an extent as to require replenishment. As the water level in the tank is lowered, the large float 8 will, of course, descend and the stud 10 will eventually rest upon the beveled extremity 19 of the latch pin 16. The descent of the float will be thereby checked for awhile but as the water level continues to fall eventually the float will be unsupported and its weight will overcome the force of the spring 17 and push the latch pin aside so that the float will then descend and rock the beam 24 to such an extent as to return the levers 30 and 62 to the position shown in Fig. 2, withdrawing the rack bar 66 from the gear 51 and the dog 41 from the sleeves 37 and 43. The rack bar 66 will then return to its upper position permitting the wind wheel to go into gear and the pump rod will again be operated.

From the foregoing description, taken in connection with the accompanying drawings, it will be seen that I have provided a very simple apparatus which will operate automatically to efficiently control the operation of a wind wheel-driven pump so that there will be a constant supply of water maintained in the tank or reservoir connected with the pump. It is to be particularly noted that by providing two floats of different areas and providing a latch controlled by the smaller float, I am enabled to maintain a supply of water without continuous uninterrupted operation of the pump, the pump being at rest until the supply of water in the tank has been substantially exhausted and being permitted to operate when filling the tank through such an interval as will insure a full supply notwithstanding the rising level of the water.

Having thus described the invention, I claim:

1. In an apparatus for the purpose set forth, the combination of means for throwing a wind wheel out of gear, float-controlled means for setting the first-mentioned means, and a second float-controlled means for temporarily restraining the first-mentioned float-controlled means.

2. In an apparatus for the purpose set forth, the combination of means for throwing a wind wheel out of gear, a float operatively connected with said means, a second float, and a latch connected with the second float and arranged to restrain the action of the first-mentioned float.

3. In an apparatus for the purpose set forth, the combination of means for throwing a wind wheel out of gear, a float operatively connected with said means, an arm connected with said float and carried below the same, a latch normally engaging said arm and restraining the movement of the said float, and a second float controlling said latch.

4. In an apparatus for the purpose set forth, the combination of a reciprocating pump rod driven by a wind wheel, an element arranged to throw the wind wheel out of gear, a rack bar, float-controlled means for locking said rack bar to the pump rod, a second rack bar connected with the element to throw the wind wheel out of gear, and means between the two rack bars for imparting a step by step movement to the second-mentioned rack bar when the first-mentioned rack bar is locked to the pump rod, the second-mentioned rack bar being brought into engagement with said mechanism through the float-controlled means.

5. In an apparatus for the purpose set forth, the combination of a reciprocating pump rod driven by a wind wheel, a rack bar normally free of the pump rod, float-controlled means for locking said rack bar to the pump rod, a gear meshing with said rack bar, a second gear, means for imparting a step by step movement to the second gear when the first gear is actuated, a float-controlled rack bar adapted to mesh with the second gear, and a connection between the second rack bar and the wind wheel whereby to throw the wind wheel out of gear.

6. In an apparatus for the purpose set forth, the combination of a reciprocating pump rod, a sleeve mounted loosely upon the pump rod, a rack bar on said sleeve, a lever carried by said sleeve, yieldable means for holding the lever away from the sleeve, a dog carried by the lever and adapted to engage the sleeve and the pump rod whereby to lock the sleeve to the pump rod, float-controlled means for rocking the lever and causing the dog to engage the sleeve and the pump rod, an element for throwing the wind wheel out of gear, and mechanism controlled by said rack bar for imparting a step by step movement to said element.

7. In an apparatus for the purpose set forth, the combination of a reciprocating pump rod driven by a wind wheel, an element for throwing the wind wheel out of gear, a rack bar carried by said element, mechanism for operatively connecting the pump rod with said rack bar whereby to impart a step by step movement to the rack bar, a lever, an arm carried by the lower end of said lever and supporting the rack bar, yieldable means acting on the lever whereby to hold the rack bar in inoperative position, and float-controlled means connected with said lever to move the rack bar into operative position and also cause the pump rod to actuate the means for imparting a step by step movement to the rack bar.

In testimony whereof I affix my signature.

FRED H. GEHRKE.